United States Patent
Tokusada (10) Patent No.: US 12,528,122 B2
(45) Date of Patent: Jan. 20, 2026

(54) METHOD OF PRODUCING SILVER POWDER, SILVER POWDER, AND CONDUCTIVE PASTE

(71) Applicant: DOWA Electronics Materials Co., Ltd., Tokyo (JP)

(72) Inventor: Kaori Tokusada, Honjo (JP)

(73) Assignee: DOWA Electronics Materials Co., Ltd., Tokyo (JP)

( * ) Notice: Subject to any disclaimer, the term of this patent is extended or adjusted under 35 U.S.C. 154(b) by 0 days.

(21) Appl. No.: 18/858,331

(22) PCT Filed: Apr. 27, 2023

(86) PCT No.: PCT/JP2023/016771
§ 371 (c)(1),
(2) Date: Oct. 21, 2024

(87) PCT Pub. No.: WO2023/210789
PCT Pub. Date: Nov. 2, 2023

(65) Prior Publication Data
US 2025/0269429 A1    Aug. 28, 2025

(30) Foreign Application Priority Data

Apr. 28, 2022 (JP) ................................ 2022-075335
Apr. 26, 2023 (JP) ................................ 2023-072504

(51) Int. Cl.
*B22F 9/04* (2006.01)
*B22F 1/052* (2022.01)
*B22F 9/16* (2006.01)

(52) U.S. Cl.
CPC ................ *B22F 9/04* (2013.01); *B22F 1/052* (2022.01); *B22F 9/16* (2013.01);
(Continued)

(58) Field of Classification Search
CPC ........................................................ B22F 9/04
See application file for complete search history.

(56) References Cited

U.S. PATENT DOCUMENTS

2022/0062985 A1* 3/2022 Kang ........................ C22C 1/03

FOREIGN PATENT DOCUMENTS

| CN | 114008724 A | 2/2022 |
| JP | 2008001974 A | 1/2008 |

(Continued)

OTHER PUBLICATIONS

Dec. 10, 2024, Office Action issued by the Taiwan Intellectual Property Office in the corresponding Taiwanese Patent Application No. 113133906.

(Continued)

*Primary Examiner* — William D Young
(74) *Attorney, Agent, or Firm* — KENJA IP LAW PC (57) ABSTRACT

Provided is a method of producing a silver powder and the silver powder that enable preparation of a conductive paste capable of forming a wiring pattern with desired line width and height. A method of producing a silver powder comprises: a disintegration step of disintegrating an agglomerated silver powder in an airflow type mill, and a classification step of classifying a silver powder after the disintegration step, in a pneumatic classifier, wherein the agglomerated silver powder has a moisture content of 2 wt % or more and 20 wt % or less, in the disintegration step, compressed air at a temperature of 80° C. or more and 180° C. or less is supplied to the airflow type mill as supply air, in the classification step, an exhaust of the airflow type mill and the silver powder after the disintegration step are supplied to the pneumatic classifier.

4 Claims, 5 Drawing Sheets

(52) U.S. Cl.
CPC ... *B22F 2301/255* (2013.01); *B22F 2304/058* (2013.01); *B22F 2304/10* (2013.01)

(56) References Cited

FOREIGN PATENT DOCUMENTS

| | | |
|---|---|---|
| JP | 2010229481 A | 10/2010 |
| JP | 2016216824 A | 12/2016 |
| JP | 2021006661 A | 1/2021 |
| WO | 2020067282 A1 | 4/2020 |

OTHER PUBLICATIONS

Oct. 22, 2024, Notification of Reasons for Refusal issued by the Japan Patent Office in the corresponding Japanese Patent Application No. 2023-136344.

Oct. 29, 2024, International Preliminary Report on Patentability issued in the International Patent Application No. PCT/JP2023/016771.

Jul. 4, 2023, International Search Report issued in the International Patent Application No. PCT/JP2023/016771.

Jun. 27, 2023, Notification of Reasons for Refusal issued by the Japan Patent Office in the corresponding Japanese Patent Application No. 2023-072504.

Jun. 7, 2024, Office Action issued by the Taiwan Intellectual Property Office in the corresponding Taiwanese Patent Application No. 112116110.

Sep. 29, 2025, Office Action issued by the Intellectual Property Corporation of Malaysia in the corresponding Malaysian Patent Application No. PI2024006055.

\* cited by examiner

METHOD OF PRODUCING SILVER POWDER, SILVER POWDER, AND CONDUCTIVE PASTE

TECHNICAL FIELD

The present disclosure relates to a method of producing a silver powder, a silver powder, and a conductive paste.

BACKGROUND

JP 2008-1974 A (PTL 1) describes a silver powder and a production method for the silver powder. The production method for the silver powder involves adding a reductant to an aqueous reaction system containing silver ions to precipitate silver particles and then filtering the aqueous reaction system to obtain a cake and drying the cake using a flash dryer to obtain the silver powder.

JP 2010-229481 A (PTL 2) describes a production method for silver particles. The production method for silver particles involves adding alcohol to a slurry of silver particles with submicron average particle size and stirring them, and then performing filtering, dehydration, drying, and disintegration. In the production method for silver particles, the drying process may be either hot air drying or vacuum drying. In hot air drying, the filtrate is placed in hot air of 30° C. to 100° C.

JP 2016-216824 A (PTL 3) describes a silver powder and a production method for the silver powder. The production method for the silver powder involves adding a reductant to an aqueous reaction system containing silver ions to reduce and precipitate silver particles and thus obtain a silver-containing slurry, filtering the silver-containing slurry and washing it with water to obtain a cake, dehydrating the cake at room temperature and disintegrating the cake at room temperature to form a disintegrated powder, and classifying the disintegrated powder at room temperature to obtain the silver powder.

CITATION LIST

Patent Literature

PTL 1: JP 2008-1974 A
PTL 2: JP 2010-229481 A
PTL 3: JP 2016-216824 A

SUMMARY

Technical Problem

A wire or contact of an electronic component produced through application of a conductive paste (hereafter also simply referred to as a paste) is obtained by applying the paste through printing or the like and then heating (typically firing) the applied paste. The paste is required to form a wiring pattern with desired line width and height when applied and fired. Typically, thinner wires are desired in electronic components in order to maximize the areas other than wiring parts and make electronic components smaller. Accordingly, a wiring pattern with high wire height is desired to prevent excessively high specific resistance even when the wire thickness is reduced.

In a conductive paste containing a silver powder as a conductive material, the surface properties (e.g. surface shape) of the silver particles in the silver powder may be controlled in order to achieve the foregoing paste performance. For example, the surfaces of the silver particles in the silver powder may be provided with desired irregularities. With conventional silver powder production methods, however, it is often difficult to obtain a silver powder having desired irregularities on its silver particle surfaces. This makes it impossible to provide a paste capable of forming a wiring pattern with desired line width and height.

It could therefore be helpful to provide a method of producing a silver powder and the silver powder that enable preparation of a conductive paste capable of forming a wiring pattern with desired line width and height, specifically, a wiring pattern thin in line width and high in height.

Solution to Problem

We thus provide the following method of producing a silver powder, silver powder, and conductive paste containing the silver powder.

<1> A method of producing a silver powder, the method comprising: a disintegration step of disintegrating an agglomerated silver powder in an airflow type mill; and a classification step of classifying a silver powder after the disintegration step, in a pneumatic classifier, wherein the agglomerated silver powder has a moisture content of 2 wt % or more and 20 wt % or less, in the disintegration step, compressed air at a temperature of 80° C. or more and 180° C. or less is supplied to the airflow type mill as supply air, in the classification step, an exhaust of the airflow type mill and the silver powder after the disintegration step are supplied to the pneumatic classifier, and the exhaust has a temperature of 30° C. or more and a volumetric humidity of 20 g/m$^3$ or more.

<2> The method of producing a silver powder according to <1>, wherein the pneumatic classifier and the airflow type mill are connected by a connection pipe, and the exhaust of the airflow type mill and the silver powder after the disintegration step are supplied from the airflow type mill to the pneumatic classifier through the connection pipe.

<3> The method of producing a silver powder according to <1> or <2>, further comprising a collection step of collecting a silver powder after the classification step, in a collector, wherein in the collection step, an exhaust of the pneumatic classifier and the silver powder after the classification step are supplied to the collector.

<4> The method of producing a silver powder according to any of <1> to <3>, wherein in the classification step, the silver powder is classified while outside air is sucked into the pneumatic classifier.

<5> A silver powder, wherein a value obtained by dividing, by D50, a difference of subtracting D10 from D90 is 1.0 or less, where D10, D50, and D90 are respectively a size in μm corresponding to a cumulative frequency of 10%, a size in μm corresponding to a cumulative frequency of 50%, and a size in μm corresponding to a cumulative frequency of 90% from a smaller particle size side in a volume-based particle size distribution in laser diffraction particle size distribution measurement, and a value of Sa×D50 obtained by multiplying Sa by D50 is 17000 nm$^2$ or more, where Sa is arithmetic mean roughness in nm in surface roughness measurement for a 500 nm×500 nm area of silver particle surfaces.

<6> A silver powder, wherein a value obtained by dividing, by D50, a difference of subtracting D10 from D90 is 1.0 or less, where D10, D50, and D90 are respectively a size in μm corresponding to a cumulative frequency of 10%, a size in μm corresponding to a cumulative frequency of 50%, and a size in μm corresponding to a cumulative frequency of 90% from a smaller particle size side in a volume-based particle size distribution in laser diffraction particle size distribution measurement, silver particles have closed voids therein, and a value of Sa×BET size obtained by multiplying Sa by BET size is 13000 nm² or more, where Sa is arithmetic mean roughness in nm in surface roughness measurement for a 500 nm×500 nm area of surfaces of the silver particles, and the BET size is calculated according to the following formula (1) with a true density of 9.7 g/cm³ using a specific surface area in m²/g measured by single-point BET method:

$$\text{BET size} = 6/(\text{specific surface area})/(\text{true density}) \qquad \text{formula (1)}.$$

<7> The silver powder according to <5> or <6>, wherein D50 is 0.4 μm or more and 4.0 μm or less.

<8> A conductive paste comprising the silver powder according to any of <5> to <7>.

Advantageous Effect

It is thus possible to provide a method of producing a silver powder and the silver powder that enable preparation of a conductive paste capable of forming a wiring pattern with desired line width and height, specifically, a wiring pattern thin in line width and high in height.

DETAILED DESCRIPTION

A method of producing a silver powder according to an embodiment of the present disclosure will be described with reference to the drawings.

Figure 1:
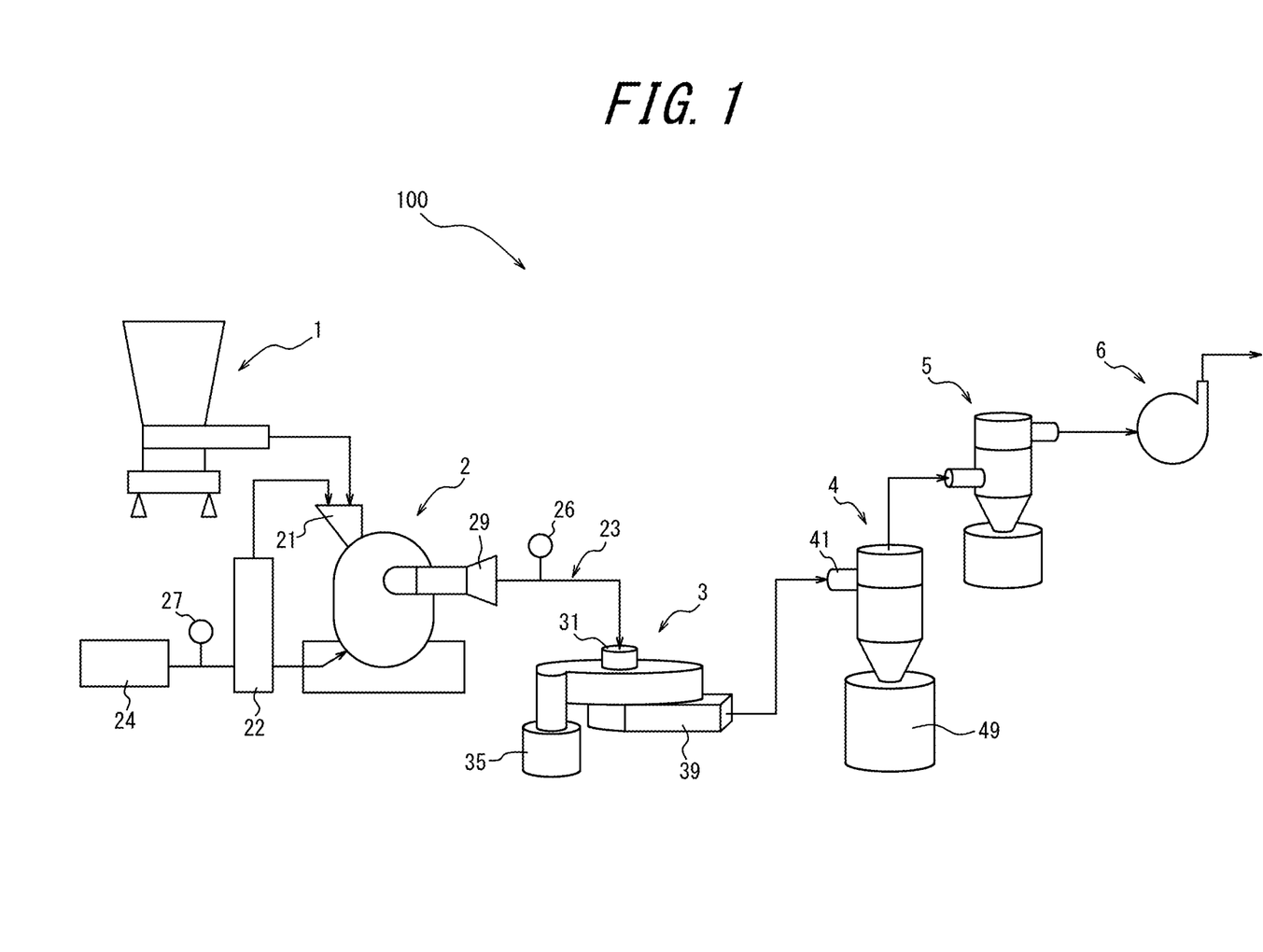
FIG. 1 is a flow diagram of a plant that implements a method of producing a silver powder according to an embodiment.
Figure 2:
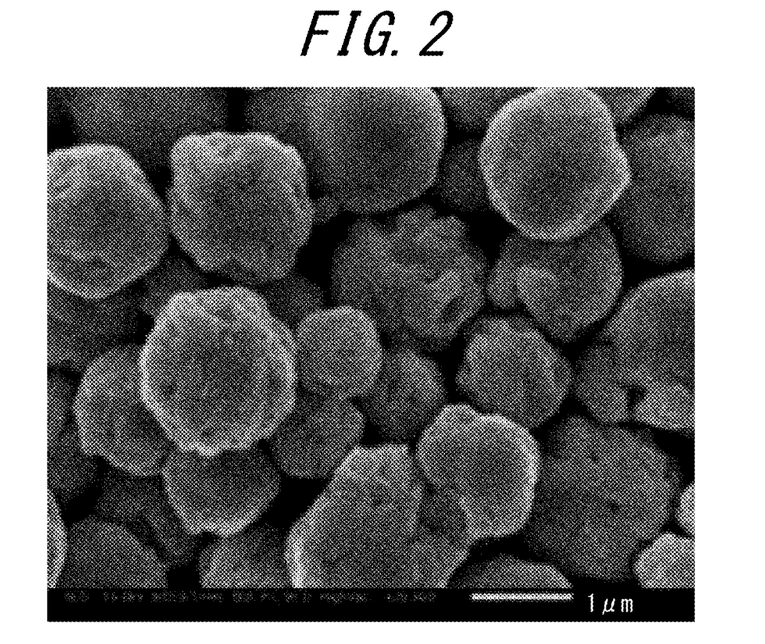
FIG. 2 is an SEM image of a silver powder in Example 1.
Figure 3:
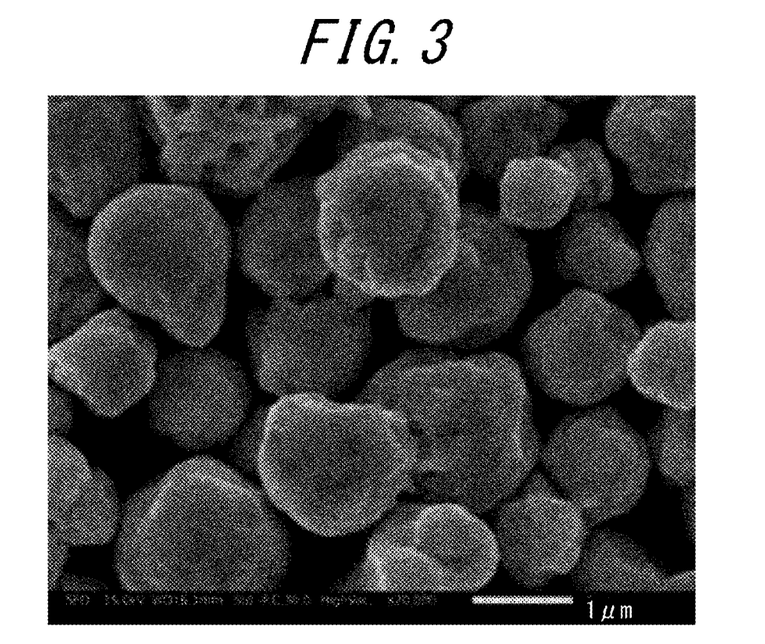
FIG. 3 is an SEM image of a silver powder in Example 2.
Figure 4:
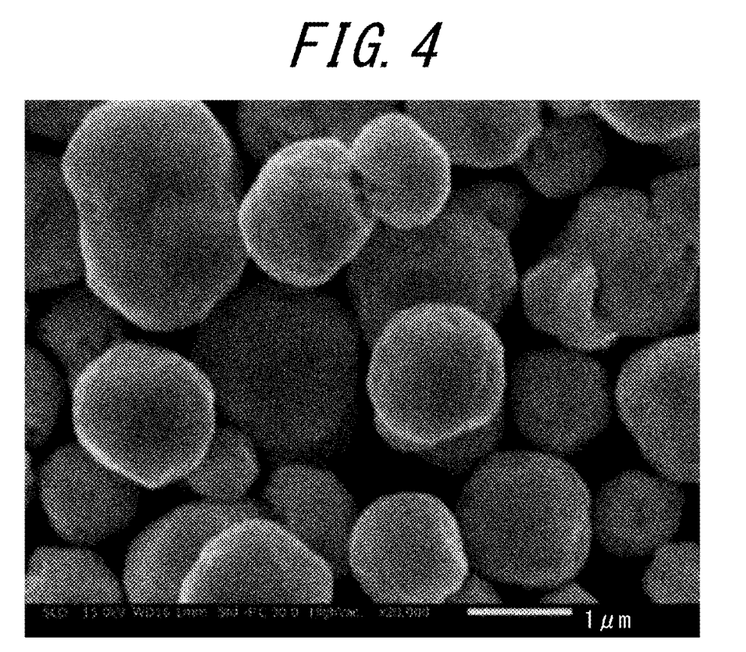
FIG. 4 is an SEM image of a silver powder in Comparative Example 1.
Figure 5:
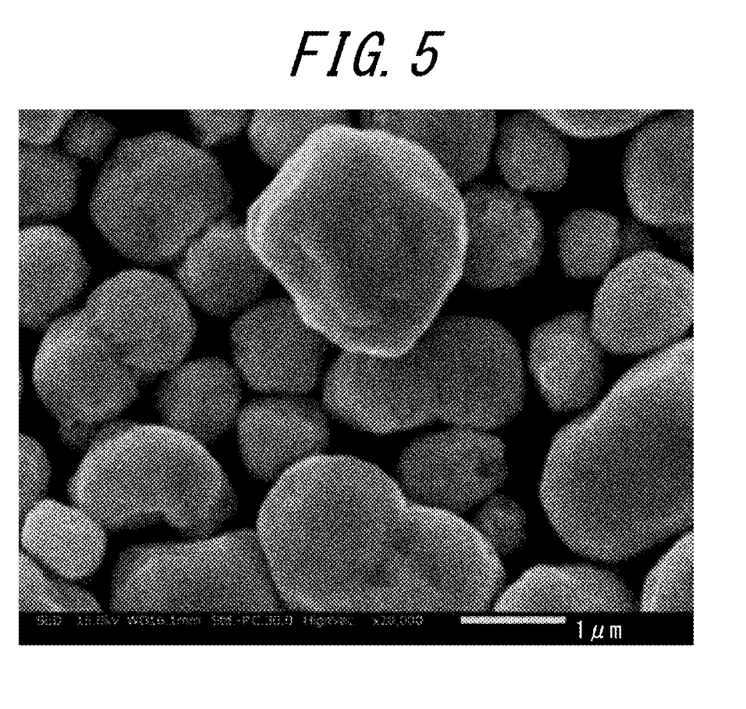
FIG. 5 is an SEM image of a silver powder in Reference Example 1.

FIG. 1 is a flow diagram of a plant 100 that implements the method of producing a silver powder according to this embodiment.

In the plant 100, a silver powder that contains moisture and is agglomerated in a wet state and that is composed of silver particles having surface irregularities (hereafter referred to as an agglomerated silver powder) is fed as raw material. The agglomerated silver powder can be produced, for example, by a wet reduction method. In the plant 100, the agglomerated silver powder is disintegrated, dried, classified, and collected to produce a silver powder suitable for preparation of a conductive paste. The silver powder produced in the plant 100 retains to some extent the surface shape of the silver particles in the agglomerated silver powder. According to the present disclosure, a silver powder having silver particles whose surfaces are smoother than the surfaces of the silver particles in the agglomerated silver powder but have desired irregularities can be produced in the plant 100.

The agglomerated silver powder as raw material can be produced, for example, by the following wet reduction method. The wet reduction method may be a method in which an alkali or complexing agent is added to a silver salt-containing aqueous solution to produce a silver oxide-containing slurry or silver complex salt-containing aqueous solution and then a reductant such as formalin is added to cause reduction precipitation of a silver powder. A method that involves a process of adding sodium hydroxide to the silver oxide-containing slurry or silver complex salt-containing aqueous solution to adjust the pH may also be used for the production. These methods are hereafter simply referred to as the wet reduction method. Silver particles may be simply referred to as particles. A silver powder is a powder of silver and is a collection of silver particles.

In the wet reduction method, it is preferable to prevent bonding of silver particles and obtain a monodispersed silver powder. In order to obtain a monodispersed silver powder, the wet reduction method may include a process of adding a dispersant to a silver slurry reduced and precipitated or a process of adding a dispersant to an aqueous reaction system containing at least one of silver salt and silver oxide prior to causing reduction precipitation of silver particles. As the dispersant, one or more selected from fatty acids, fatty acid salts, surfactants, organic acids such as amino acids, organic metals, chelating agents, and protective colloids may be used. In order to obtain a dried silver powder from the silver slurry, a solid-liquid separation step such as filter press and a drying step are needed. Even if the silver particles are monodispersed in the silver slurry reduced and precipitated by the wet reduction method, the silver powder resulting from subjecting the silver slurry to the solid-liquid separation step such as filter press and the drying step is often agglomerated and difficult to be used as a silver powder for conductive paste. It is often considered undesirable for a silver powder for conductive paste to contain coarse particles. For this reason, a method often used to obtain a silver powder for conductive paste from a silver slurry reduced and precipitated by the wet reduction method involves subjecting the silver slurry to solid-liquid separation, drying, disintegration, and classification to remove coarse particles.

The plant 100 includes a feeder 1, an airflow type mill 2 (hereafter referred to as a mill 2), a pneumatic classifier 3 (hereafter referred to as a classifier 3), a cyclone 4 as a collector, a dust collector 5, and a blower 6.

In the plant 100, the mill 2, the classifier 3, the cyclone 4, the dust collector 5, and the blower 6 are connected in series in this order, and the airflow that has passed through the mill 2, the classifier 3, the cyclone 4, and the dust collector 5 is sucked in by the blower 6. It is preferable that the silver powder is air-transported between the mill 2 and the classifier 3, between the classifier 3 and the cyclone 4, and between the cyclone 4 and the dust collector 5.

The feeder 1 is a device that feeds the agglomerated silver powder to the mill 2. The feeder 1 may be, for example, a screw feeder. The agglomerated silver powder fed from the feeder 1 to the mill 2 has a moisture content of 2 wt % (mass %) or more and 20 wt % or less. The moisture content of the agglomerated silver powder is preferably 8 wt % or more and 15 wt % or less, and more preferably 11 wt % or less.

The mill 2 is a device that implements a disintegration step of disintegrating the agglomerated silver powder. The agglomerated silver powder and compressed air are supplied to the internal space of the mill 2 to disintegrate the agglomerated silver powder.

The compressed air for disintegrating the agglomerated silver powder is supplied by being sprayed into the internal space of the mill 2 through an injection nozzle that communicates with the internal space of the mill 2. The injection nozzle is located, for example, at the bottom of the mill 2 to spray the compressed air into the lower region of the internal space. A plurality of injection nozzles may be arranged at different parts of the mill 2. In FIG. 1, injection nozzles are arranged at the top and bottom of the mill 2.

In the disintegration step, the compressed air supplied to the injection nozzle of the mill 2 (the compressed air supplied to the injection nozzle is hereafter referred to as supply air or disintegration air) is heated by a heater 22 in the supply path of the supply air so that the temperature of the compressed air entering the mill 2 will be 80° C. or more and 180° C. or less. The temperature of the compressed air entering the mill 2 is preferably 150° C. or less. As the pressure of the compressed air supplied to the injection nozzle of the mill 2, for example, the supply pressure of an air pump 24 (at room temperature before heating) may be 0.1 MPa or more and 0.8 MPa or less, and is preferably 0.4 MPa or more and 0.6 MPa or less.

The agglomerated silver powder is supplied to the internal space of the mill 2 from a different path from the compressed air. Any supply mechanism capable of feeding the agglomerated silver powder to the inside of the mill 2 may be used. An injection nozzle may be provided at a mill supply port 21 to be used as a force for supplying the disintegration air and the agglomerated silver powder into the mill. Another structure that may be used is a supply mechanism such as a venturi or ejector provided at the mill supply port 21. The supply air used when supplying the agglomerated silver powder to the mill 2 may be heated to 80° C. or more and 180° C. or less by the heater 22 in the supply path of the supply air. As the pressure of the supply air, the supply pressure of the air pump 24 (at room temperature before heating) may be 0.1 MPa or more and 0.8 MPa or less.

In the internal space of the mill 2, the disintegration of the agglomerated silver powder progresses by the shear force of the disintegration air sprayed from the injection nozzle, the collision between the agglomerated particles in the agglomerated silver powder accelerated by the disintegration air, and the collision between the agglomerated particles accelerated by the disintegration air and the wall surface inside the tank of the mill 2. In this embodiment, the "agglomerated particles in the agglomerated silver powder" refer to secondary particles formed by agglomeration of monodispersed silver particles as described with regard to the wet reduction method above.

In the disintegration step, the foregoing collisions cause, simultaneously with disintegration, reduction of the surface irregularities of the silver particles, as a result of which fine particles are scraped off and the surfaces of the silver particles are smoothed. In this embodiment, the atmosphere in the mill becomes moist gas as the moisture in the agglomerated silver powder evaporates due to the high-temperature disintegration air. Disintegration and surface smoothing in the disintegration step are carried out in the moist gas. Typically, particles are more likely to agglomerate when the gas contains more moisture. Therefore, disintegration and surface smoothing are carried out in a state in which agglomeration is more likely to occur than in the case where a dry silver powder is disintegrated in dry air. Hence, it is expected that collisions between agglomerated particles and re-adhesion of scraped-off fine particles are more likely to occur in the mill. The silver particles obtained in this embodiment have greater surface irregularities than silver particles that have undergone disintegration in a conventional atmosphere with less moisture.

Examples of the mill 2 include Current Jet Mill (produced by Nisshin Engineering Inc.), SK Jet O' Mill (produced by Seishin Enterprise Co., Ltd.), Super Jet Mill (produced by Nisshin Engineering Inc.), and Spiral Jet Mill (produced by Hosokawa Micron Corporation), which continuously supply compressed air to the internal space to cause swirling flow and carry out disintegration in the swirling flow, as well as Opposed Jet Mill (produced by Hosokawa Micron Corporation) and Cross Jet Mill (produced by Kurimoto, Ltd.), which have a built-in classification rotor and supply compressed air into the fluidized bed formed in the internal space to carry out disintegration.

The following will describe an example in which the mill 2 is an airflow type mill whose internal space is continuously supplied with disintegration air to cause swirling flow and carry out disintegration in the swirling flow and is supplied with an agglomerated silver powder from the mill supply port 21 through a different path from that of the supply air (disintegration air).

The agglomerated silver powder and the supply air are supplied to the mill 2 at a ratio adjusted so that the exhaust of the mill 2 will be 30° C. or more in temperature and 20 $g/m^3$ or more in volumetric humidity. The volumetric humidity is preferably 30 $g/m^3$ or more. The volumetric humidity is hereafter simply referred to as absolute humidity. The temperature and absolute humidity of the exhaust of the mill 2 can be obtained by measuring the temperature and humidity (relative humidity) in a connection pipe 23 using a humidity-temperature meter 26, for example.

The classifier 3 is a pneumatic classifier that implements a classification step of separating and removing (i.e. classifying) coarse particles (coarse powder) or fine powder from the silver powder after the disintegration step. The following will describe an example in which the classifier 3 separates and removes coarse powder.

One example of the classifier 3 has a classification mechanism that performs classification through the balance between the centrifugal force caused by swirling flow generated through supply or suction of airflow and the force of airflow in a direction against the centrifugal force. Another example of the classifier 3 has a classification mechanism that performs classification through the balance between the centrifugal force generated through a rotating rotor and the force of airflow in a direction against the centrifugal force. Specific examples include Aerofine Classifier (produced by Nisshin Engineering Inc.), which implements classification using centrifugal force due to swirling flow generated through supply of high-speed airflow, and Turbo Classifier (produced by Nisshin Engineering Inc.), which uses centrifugal force due to swirling flow generated through a rotating rotor.

The following will describe an example in which the classifier 3 is a pneumatic classifier having a classification mechanism that performs classification through the balance between the centrifugal force due to swirling flow generated through a rotating rotor and the force of airflow when the exhaust of the mill 2 or an airflow (e.g. outside air) other than the exhaust is sucked in against the centrifugal force and moves toward an airflow classifier exhaust port 39. Here, the exhaust of the mill 2 is supplied to a classifier supply port 31 together with the silver powder that has undergone the disintegration step, and the other airflow can be generated by gas sucked into the classifier 3 through a different path from that of the exhaust of the mill 2. The outside air sucked into the classifier 3 preferably has an absolute humidity of less than 15 g/m³, and more preferably has an absolute humidity of 12 g/m³ or less. The outside air sucked into the classifier 3 may have a temperature of less than 30° C. and a relative humidity of less than 50%. The relative humidity may be 40% or less.

The silver powder after the disintegration step (i.e. the silver powder disintegrated in the mill 2) and the exhaust of the mill 2 are supplied to the classifier 3. The classifier supply port 31 of the classifier 3 is preferably connected to a mill exhaust port 29 of the mill 2 by the connection pipe 23. Thus, all of the silver powder after the disintegration step and all of the exhaust of the mill 2 are supplied to the classifier 3 via the connection pipe 23 and the classifier supply port 31. In other words, the connection pipe 23 achieves air transportation of the silver powder after the disintegration step by the airflow of the exhaust of the mill 2.

In the plant 100, the exhaust of the mill 2 flowing through the connection pipe 23 is controlled to a temperature of 30° C. or more and an absolute humidity of 20 g/m³ or more. This can simplify the process by integrating the drying and disintegration steps, and achieve a method of producing a silver powder that enable preparation of a conductive paste capable of forming a wiring pattern with desired line width and height.

As a result of the exhaust of the mill 2 flowing through the connection pipe 23 being controlled to a temperature of 30° C. or more and an absolute humidity of 20 g/m³ or more, the gas is moist at the classifier supply port 31 but, as the classification step progresses, is mixed with the outside air and the moisture content of the gas transporting the silver powder gradually decreases. Classification is performed along with this change in the moisture content of the transporting gas. Typically, particles are more likely to agglomerate when the gas contains more moisture. Accordingly, silver particles that tend to agglomerate are easily removed as coarse powder in the early stage of classification. In other words, silver particles can be sorted based on ease of agglomeration as compared with the case where dry silver powder is classified in dry air.

Of the silver powder after the disintegration step that is supplied to the classifier 3, coarse powder is discharged from a coarse powder discharge port 35. The silver powder after the disintegration step that is supplied to the classifier 3, except for the coarse powder, is discharged from the classifier exhaust port 39 of the classifier 3 together with the exhaust of the classifier 3 and supplied (sucked) to the cyclone 4 from a cyclone inlet port 41 through air transportation.

The cyclone 4 implements a collection step of collecting the silver powder supplied from the classifier 3 by a collector. Here, fine particles are removed from the silver powder. The silver powder is collected, for example, in a collection pot 49 at the bottom of the cyclone 4. The silver powder collected in the cyclone 4 is a silver powder according to this embodiment.

The agglomerated silver powder is dried as well as disintegrated due to solid-gas contact during the process of disintegration in the mill 2, classification in the classifier 3, and collection in the cyclone 4. The silver powder collected in the cyclone 4 is therefore drier than the agglomerated silver powder. In the plant 100, as a result of compressed air heated to 80° C. or more and 180° C. or less being supplied to the internal space of the mill 2, the silver powder is dried in the mill 2, the classifier 3, and the cyclone 4, so that the silver powder collected in the cyclone 4 is sufficiently dried to require no further finish drying (for example, the moisture content of the silver powder is 0.1 mass % or less).

The exhaust of the cyclone 4 is sucked into the blower 6 via the dust collector 5 and exhausted to outside the plant 100. The dust collector 5 filters the exhaust of the cyclone 4, and collects fine silver powder not collected by the cyclone 4.

The method of producing a silver powder according to this embodiment is carried out as described above.

A silver powder according to the present disclosure will be described below.

In the silver powder according to the present disclosure, the value obtained by dividing, by D50, the difference of subtracting D10 from D90 is preferably 1.0 or less, where D10, D50, and D90 are respectively the size corresponding to the cumulative frequency of 10% (μm), the size corresponding to the cumulative frequency of 50% (μm), and the size corresponding to the cumulative frequency of 90% (μm) from the smaller particle size side in the volume-based particle size distribution in laser diffraction particle size distribution measurement. If this value is more than 1.0, it may be difficult to obtain a wiring pattern with desired line width and height by making the silver powder into a paste and firing it. The difference of subtracting D10 from D90 can be 0.1 μm or more and 4.0 μm or less.

The silver particles constituting the silver powder preferably have closed voids therein. This makes it possible to lower the firing temperature for obtaining a wiring pattern.

The arithmetic mean roughness Sa (nm) in surface roughness measurement for a 500 nm×500 nm area of the surfaces of the silver particles constituting the silver powder is preferably 9 nm or more and more preferably 10 nm or more. If Sa is less than 9 nm, it may be difficult to obtain a wiring pattern with desired line width and height by making the silver powder into a paste and firing it. If Sa is excessively large, the viscosity of the paste may be excessively high. Therefore, Sa may be 40 nm or less.

The value of Sa×BET size obtained by multiplying Sa by BET size is preferably 13000 nm² or more and more preferably 14000 nm² or more, where Sa is the arithmetic mean roughness (nm) in surface roughness measurement for a 500 nm×500 nm area of the surfaces of the silver particles constituting the silver powder, and BET size is calculated according to the following formula (1) with a true density of 9.7 g/cm³ using the specific surface area (m²/g) of the silver powder measured by single-point BET method:

$$\text{BET size} = 6/(\text{specific surface area})/(\text{true density}) \qquad \text{formula (1)}.$$

As a result of the value being in this range, the line width of the wiring pattern obtained by making the silver powder into a paste and firing it can be narrowed as compared with conventional techniques regardless of the magnitude of BET size.

In the silver powder, the value of Sa×D50 obtained by multiplying Sa by D50 is preferably 17000 nm² or more and more preferably 18500 nm² or more. As a result of the value being in this range, the line width of the wiring pattern obtained by making the silver powder into a paste and firing it can be narrowed as compared with conventional techniques regardless of the magnitude of D50.

D50 of the silver powder is preferably 0.4 μm or more and 4.0 μm or less, more preferably 1.0 μm or more and 3.0 μm or less, and further preferably 1.0 μm or more and 2.5 μm or less. If D50 of the silver powder is more than 4.0 μm, it may be difficult to obtain a wiring pattern with a narrow (thin)

width. If D50 of the silver powder is less than 0.4 µm, the viscosity of the paste formed from the silver powder may be excessively high, making the paste difficult to handle. For the same reasons, D90 is preferably 0.45 µm or more and 7.0 µm or less, and D10 is preferably 0.1 µm or more and 3.8 µm or less.

The BET size of the silver powder is preferably 0.3 µm or more and 3.5 µm or less, more preferably 0.8 µm or more and 3.0 µm or less, and further preferably 0.8 µm or more and 2.5 µm or less. If the BET size of the silver powder is more than 3.5 µm, it may be difficult to obtain a wiring pattern with a narrow width. If the BET size of the silver powder is less than 0.3 µm, the viscosity of the paste formed from the silver powder may be excessively high, making the paste difficult to handle.

The value calculated according to the following formula (2), which is the ratio of D50 to BET size of the silver powder, is preferably 1.8 or less, more preferably 1.6 or less, and further preferably 1.5 or less:

$$D50/BET\ size \qquad \text{formula (2).}$$

If the value is more than 1.8, the degree of agglomeration of the silver particles in the silver powder is high, and it may be difficult to obtain a wiring pattern with desired line width and height, in particular a wiring pattern with a narrow width.

The moisture content of the silver powder is preferably 0.1 mass % or less, more preferably 0.05 mass % or less, and further preferably 0.01 mass % or less. If the moisture content of the silver powder is more than 0.1 mass %, the silver powder may agglomerate in the paste and cause an increase in viscosity, or the silver powder may agglomerate and cause clogging of the printing plate, resulting in disconnection.

A conductive paste according to the present disclosure contains at least the silver powder according to the present disclosure, and may optionally contain an organic binder and a solvent.

The organic binder is not limited, and examples thereof include silicone resin, epoxy resin, acrylic resin, polyester resin, polyimide resin, polyurethane resin, phenoxy resin, and cellulose-based resin (ethyl cellulose, hydroxypropyl cellulose, etc.). These may be used alone or in combination of two or more in any ratio.

The solvent is not limited, and examples thereof include alcohol-based solvents such as terpineol, butyl carbitol, texanol, ethylene glycol, and diethylene glycol; ester-based solvents such as butyl carbitol acetate and ethyl acetate; hydrocarbon-based solvents such as toluene, xylene, and cyclohexane; and glycerin. These may be used alone or in combination of two or more in any ratio.

The content of the silver powder according to the present disclosure in the conductive paste may be 80 mass % or more and is preferably 85 mass % or more, and may be 95 mass % or less and is preferably 90 mass % or less.

The content of the organic binder in the conductive paste may be 0.1 mass % or more and is preferably 0.2 mass % or more, and may be 0.4 mass % or less and is preferably 0.3 mass % or less.

The content of the solvent in the conductive paste may be 6 mass % or more and is preferably 7 mass % or more, and may be 20 mass % or less and is preferably 15 mass % or less.

The conductive paste may contain optional components such as glass frit, dispersant, surfactant, viscosity modifier, and slip agent. The conductive paste used in the production of solar cell electrodes preferably contains glass frit, for example, Pb—Te—Bi-based or Pb—Si—B-based glass frit.

The method of producing the conductive paste is not limited, and a method of mixing the spherical silver powder according to the present disclosure, an organic binder, a solvent, and optional components as appropriate may be used. The mixing method is not limited, and, for example, a planetary stirrer, ultrasonic dispersion, a disper, a three-roll mill, a ball mill, a bead mill, a two-axis kneader, etc. may be used.

The conductive paste according to the present disclosure may be applied to a substrate by, for example, printing such as screen printing, offset printing, or photolithography, or dipping to form a coating film. The coating film may be formed into a predetermined pattern by photolithography using a resist.

The coating film may be fired to form a conductive film. The firing may be performed in an air atmosphere or in a non-oxidizing atmosphere such as nitrogen. The firing temperature of the coating film may be 600° C. or more and 800° C. or less, and is preferably 690° C. or more and 740° C. or less. The firing time may be 20 seconds or more and 1 hour or less, and is preferably 40 seconds or more and 2 minutes or less.

EXAMPLES

Examples of the method of producing a silver powder and the silver powder produced by the production method according to this embodiment will be described below.

Example 1

A silver powder in Example 1 was produced as follows.

An agglomerated silver powder to be fed to the plant 100 was produced as follows. 27.74 kg of a 26 wt % ammonia aqueous solution was added to 2955 kg of a silver nitrate aqueous solution containing 47.5 kg of silver as a silver ion aqueous solution, and the liquid temperature was set to 28.3° C. 154.6 kg of a 37 wt % formalin aqueous solution was further added as a reductant and thoroughly stirred to obtain a slurry containing a silver powder.

Moreover, 5.0 kg of a liquid containing pure water and 0.54 kg of a stearic acid emulsion was added to the obtained slurry to obtain a silver slurry. The silver slurry was filtered, washed with water, and then pressure filtered to obtain a silver powder (agglomerated silver powder). Observing the cross-section of the fine silver particles (raw material particles) of the obtained silver powder with a scanning electron microscope revealed that the particles had closed voids therein. The moisture content (loss on drying) of the agglomerated silver powder was 10.02 wt %.

Furthermore, the agglomerated silver powder was disintegrated and dried in the foregoing plant 100, and the silver powder collected in the cyclone 4 was further sieved with a sieve having an opening size of 40 µm. The silver powder that passed through the sieve was taken to be the silver powder in Example 1. Observing the cross-section of the particles of the silver powder in Examples 1 and 2 with a scanning electron microscope revealed that the particles had closed voids therein.

Table 1 shows the operating conditions of the plant 100 when producing the silver powder in Example 1. The operating conditions of the plant 100 in each of the below-described Examples 2 and 3, Comparative Examples 1 and 2, and Reference Example 1 are also shown in Table 1. Herein, "supply air B" is the air supplied to the injection nozzle at the bottom of the mill, and "supply air A" is the air supplied to the injection nozzle at the top of the mill.

TABLE 1

| | Environment | | Moisture content of agglomerated silver powder | Feeder | Mill | | | | |
|---|---|---|---|---|---|---|---|---|---|
| | Air temperature | Relative humidity | | Feed rate | Total supply amount | Supply air A | | Supply air B | |
| | ° C. | % | wt % | kg/min | m³/min | m³/min | MPa | m³/min | MPa |
| Example 1 | 16 | 47 | 10.02 | 1.5 | 4.0 | 1.5 | 0.6 | 2.5 | 0.6 |
| Example 2 | 16 | 47 | 10.02 | 1.2 | 3.2 | 1.1 | 0.4 | 2.1 | 0.4 |
| Comparative Example 1 | 16 | 47 | 0.01 | 1.5 | 3.8 | 1.5 | 0.6 | 2.3 | 0.6 |
| Reference Example 1 (First time) | 13 | 42 | 10.40 | 1.5 | 4.5 | 1.5 | 0.6 | 3.0 | 0.6 |
| Reference Example 1 (Second time) | 13 | 42 | 0.01 | 1.5 | 4.8 | 1.5 | 0.6 | 3.3 | 0.6 |
| Example 3 | 11 | 44 | 7.83 | 1.0 | 4.0 | 1.5 | 0.6 | 2.5 | 0.6 |
| Comparative Example 2 | 14 | 44 | 0.01 | 1.4 | 4.0 | 1.5 | 0.6 | 2.5 | 0.6 |

| | Mill Temperature ° C. | Mill exhaust | | | Classifier | Blower |
|---|---|---|---|---|---|---|
| | | Temperature ° C. | Relative humidity % | Absolute humidity g/m³ | Suction air volume m³/min | Exhaust air volume m³/min |
| Example 1 | 120 | 54 | 39 | 39 | 5.0 | 9.0 |
| Example 2 | 130 | 36 | 92 | 39 | 5.8 | 9.0 |
| Comparative Example 1 | 16 | 16 | 10 | 1.4 | 5.2 | 9.0 |
| Reference Example 1 (First time) | 110 | 48 | 48 | 36 | 4.5 | 9.0 |
| Reference Example 1 (Second time) | 13 | 13 | 12 | 1.4 | 4.2 | 9.0 |
| Example 3 | 150 | 65 | 13 | 21 | 5.0 | 9.0 |
| Comparative Example 2 | 14 | 14 | 12 | 1.4 | 5.0 | 9.0 |

In Table 1, "Environment" indicates the air temperature (° C.) and relative humidity (%) of the atmosphere around the plant 100 during production. These are the air temperature and relative humidity of the outside air sucked into the classifier 3 (described later).

In Table 1, "Moisture content of agglomerated silver powder" indicates the moisture content (wt %) of the agglomerated silver powder.

In Table 1, "Feeder" indicates the feed rate (kg/min) when supplying the agglomerated silver powder from the feeder 1 to the mill 2. "Mill" indicates the total amount of supply air (m³/min) supplied to the mill 2, the amount of supply air (m³/min) supplied to each injection nozzle and its pressure (MPa), and the temperature (° C.) as the disintegration conditions in the mill 2. Herein, the total amount of air is the total amount of supply air supplied to the upper and lower injection nozzles of the mill. The total amount of air and the amount of supply air supplied to each injection nozzle are values before heating, measured by a flowmeter 27 installed in the supply path, and expressed as values at 1 atmosphere and 0° C. (normal conversion values). In Table 1, the value of "Temperature" in the "Mill" column is the outlet temperature of the heater 22, representing the temperature of the supply air after heating and before being supplied to the mill.

In the following description, the case where the temperature of supply air A and supply air B was 80° C. or more is regarded as the case where the drying process in the plant 100 was performed. In Example 1, since the temperature of supply air A and supply air B was 120° C. as shown in Table 1, the drying process in the plant 100 was performed.

In Table 1, "Mill exhaust" indicates the temperature (° C.) of the exhaust of the mill 2, the relative humidity (%) of the exhaust, and the absolute humidity (g/m³) of the exhaust.

In Table 1, "Classifier" indicates the suction air volume (m³/min) of outside air sucked into the classifier 3 apart from the exhaust of the mill 2 as the conditions of the classifier 3. The suction air volume is expressed as a normal flow rate.

In Table 1, "Exhaust air volume" in the "Blower" column indicates the set value of the exhaust air volume (m³/min) in the blower 6. The exhaust air volume is expressed as a normal flow rate.

In Table 1, the suction air volume of outside air sucked into the classifier 3 is not an actual measured value but a calculated value obtained by subtracting the total amount of air supplied to the mill 2 from the exhaust air volume of the blower 6.

Example 2

A silver powder in Example 2 was produced as follows. An agglomerated silver powder (moisture content: 10.02 wt %) produced in the same manner as in Example 1 was fed to the plant 100, and disintegrated and dried under different operating conditions of the plant 100 from those in Example 1. The silver powder collected in the cyclone 4 was sieved with a sieve having an opening size of 40 μm as in Example 1. The silver powder that passed through the sieve was taken to be the silver powder in Example 2. Table 1 shows the operating conditions of the plant 100 when producing the silver powder in Example 2. In Example 2, since the temperature of supply air A and supply air B was 130° C. as shown in Table 1, the drying process in the plant 100 was performed.

Comparative Example 1

A silver powder in Comparative Example 1 was produced without performing the drying process in the plant 100, unlike the foregoing Examples. In detail, an agglomerated silver powder produced in the same manner as in Example 1 was dried in a vacuum rotary dryer and then roughly disintegrated by stirring using a Henschel mixer, unlike in Example 1. The roughly disintegrated agglomerated silver powder (moisture content: 0.01 wt %) was fed to the plant 100 as in Example 1, and disintegrated under different operating conditions of the plant 100 from those in Example 1. The silver powder collected in the cyclone 4 was taken to be the silver powder in Comparative Example 1. Table 1 shows the operating conditions of the plant 100 when producing the silver powder in Comparative Example 1. In Comparative Example 1, since the temperature of supply air A and supply air B was 16° C. as shown in Table 1, the drying process in the plant 100 was not performed as mentioned above. In addition, the absolute humidity of the air exhausted from the mill, which was supplied to the classifier, was low.

Reference Example 1

A silver powder in Reference Example 1 was processed twice in the plant 100, unlike in Example 1. In detail, an agglomerated silver powder (moisture content: 10.40 wt %) produced in the same manner as in Example 1 was fed to the plant 100, and disintegrated and dried under different operating conditions of the plant 100 from those in Example 1 (first time). The silver powder (moisture content: 0.01 wt %) collected in the cyclone 4 as in Example 1 was fed to the plant 100 again (second time), and the silver powder collected in the cyclone 4 again was sieved with a sieve having an opening size of 40 μm. The silver powder that passed through the sieve was taken to be the silver powder in Reference Example 1.

Table 1 shows the operating conditions of the plant 100 when producing the silver powder in Reference Example 1. In Table 1, "Moisture content of agglomerated silver powder" indicates the moisture content of the silver powder fed to the plant 100 the second time (i.e. the silver powder collected by the cyclone 4 in the first processing). In Table 1, "Reference Example 1 (First time)" indicates the operating conditions of the plant 100 during the first processing, and "Reference Example 1 (Second time)" indicates the operating conditions of the plant 100 during the second processing. In Reference Example 1, the drying process in the plant 100 was performed during the first processing (the temperature of supply air A and supply air B was 110° C.), and the drying process in the plant 100 was not performed during the second processing (the temperature of supply air A and supply air B was 13° C.).

Next, an agglomerated silver powder different from the agglomerated silver powder used in Examples 1 and 2, Comparative Example 1, and Reference Example 1 above was used and the operating conditions of the plant 100 were changed, and the resulting silver powder was examined.

Example 3

A silver powder in Example 3 was produced as follows.

First, an agglomerated silver powder to be fed to the plant 100 was produced as follows. 35.52 kg of a 26 wt % ammonia aqueous solution was added to 2630 kg of a silver nitrate aqueous solution containing 38.9 kg of silver as a silver ion aqueous solution, and the liquid temperature was set to 32.0° C. 171.2 kg of a 37 wt % formalin aqueous solution was further added as a reductant and thoroughly stirred to obtain a slurry containing a silver powder.

Moreover, 4.05 kg of a stearic acid emulsion was added to the obtained slurry to obtain a silver slurry. The silver slurry was filtered, washed with water, and then pressure filtered to obtain a silver powder (agglomerated silver powder). Observing the cross-section of the fine silver particles (raw material particles) of the obtained silver powder with a scanning electron microscope revealed that the particles had closed voids therein. The moisture content (loss on drying) of the agglomerated silver powder was 7.83 wt %.

Furthermore, the agglomerated silver powder was disintegrated and dried in the plant 100, and the silver powder collected in the cyclone 4 was further sieved with a sieve having an opening size of 40 μm. The silver powder that passed through the sieve was taken to be the silver powder in Example 3. Observing the cross-section of the particles of the silver powder in Example 3 with a scanning electron microscope revealed that the particles had closed voids therein.

Table 1 shows the operating conditions of the plant 100 when producing the silver powder in Example 3. In Example 3, since the temperature of supply air A and supply air B was 150° C. as shown in Table 1, the drying process in the plant 100 was performed.

Comparative Example 2

A silver powder in Comparative Example 2 was produced without performing the drying process in the plant 100, as in Comparative Example 1. In detail, an agglomerated silver powder produced in the same manner as in Example 3 was dried in a vacuum rotary dryer and then roughly disintegrated by stirring using a Henschel mixer, unlike in Example 3. The roughly disintegrated agglomerated silver powder (moisture content: 0.01 wt %) was fed to the plant 100 as in Example 3, and disintegrated under different operating conditions of the plant 100 from those in Example 3. The silver powder collected in the cyclone 4 was taken to be the silver powder in Comparative Example 2. Table 1 shows the operating conditions of the plant 100 when producing the silver powder in Comparative Example 2. In Comparative Example 2, since the temperature of supply air A and supply air B was 14° C. as shown in Table 1, the drying process in the plant 100 was not performed as mentioned above. In addition, the absolute humidity of the air exhausted from the mill, which was supplied to the classifier, was low.

Tables 2 and 3 show the evaluation values of the silver powders in the Examples, Comparative Examples, and Reference Example. Each evaluation value shown in Tables 2 and 3 will be explained below.

TABLE 2

| | SSA m²/g | D10 μm | D50 μm | D90 μm | (D90 − D10)/ D50 | Moisture content of silver powder % | Loss on ignition % | TAP g/mL | Sa nm | Sa × D50 nm² | BET size μm | Sa × BET size nm² |
|---|---|---|---|---|---|---|---|---|---|---|---|---|
| Example 1 | 0.50 | 1.06 | 1.65 | 2.51 | 0.88 | <0.01 | 0.67 | 5.3 | 11.5 | 18973 | 1.25 | 14394 |
| Example 2 | 0.52 | 1.05 | 1.70 | 2.72 | 0.98 | <0.01 | 0.69 | 5.5 | 13.4 | 22844 | 1.20 | 16079 |
| Comparative Example 1 | 0.43 | 1.10 | 1.90 | 3.10 | 1.05 | <0.01 | 0.66 | 5.2 | 8.3 | 15732 | 1.44 | 11911 |
| Reference Example 1 | 0.49 | 1.19 | 1.76 | 2.60 | 0.80 | <0.01 | 0.65 | 4.8 | 7.4 | 13042 | 1.27 | 9408 |
| Example 3 | 0.40 | 1.68 | 2.38 | 3.45 | 0.74 | <0.01 | 0.52 | 5.7 | 11.5 | 27383 | 1.55 | 17814 |
| Comparative Example 2 | 0.30 | 1.52 | 2.71 | 4.46 | 1.08 | <0.01 | 0.52 | 5.9 | 4.2 | 11340 | 2.21 | 9278 |

TABLE 3

| | Sz nm | Sp nm | Sv nm | Sq nm |
|---|---|---|---|---|
| Example 1 | 122.7 | 63.1 | 59.6 | 14.8 |
| Example 2 | 125.0 | 54.3 | 70.8 | 17.2 |
| Comparative Example 1 | 92.3 | 42.9 | 49.4 | 10.8 |
| Reference Example 1 | 78.4 | 38.8 | 39.6 | 9.6 |
| Example 3 | 64.1 | 24.1 | 40.0 | 9.5 |
| Comparative Example 2 | 51.8 | 18.5 | 33.4 | 5.6 |

In Table 2, "SSA" (m²/g) is the specific surface area of the silver powder. As the specific surface area of the silver powder, the BET specific surface area determined by the BET method was used. The BET specific surface area was measured by single-point BET method using a BET specific surface area measurement device (Macsorb HM-model 1210 produced by Mountech Co., Ltd.) after performing 10 minutes of deaeration of the inside of the measurement device at 60° C. by passing He—$N_2$ mixed gas (30% nitrogen).

In Table 2, "BET size" (μm) is the specific surface area size calculated according to the following formula (1) based on the BET specific surface area (m²/g) of the silver powder and the true density of the silver powder (a true density of 9.7 g/cm³ is used in this embodiment).

BET size(μm)=6/(specific surface area)/(true density)    formula (1).

In Table 2, "D10" (μm), "D50" (μm), and "D90" (μm) respectively indicate the size corresponding to the cumulative frequency of 10% (μm), the size corresponding to the cumulative frequency of 50% (μm), and the size corresponding to the cumulative frequency of 90% (μm) from the smaller particle size side in the volume-based particle size distribution of the silver powder in laser diffraction particle size distribution measurement. Herein, the size corresponding to the cumulative frequency of 50% based on volume is the median size (diameter). Hereafter, the size corresponding to the cumulative frequency of 10% (μm), the size corresponding to the cumulative frequency of 50% (μm), and the size corresponding to the cumulative frequency of 90% (μm) are denoted by D10, D50, and D90 respectively.

As the particle size distribution of the silver powder, the particle size distribution measured using a laser diffraction/scattering particle size distribution measurement device (MICROTRAC MT-3300 EXII produced by MicrotracBEL Corp.) for achieving laser diffraction particle size distribution measurement was used.

The particle size distribution was measured using the laser diffraction/scattering particle size distribution measurement device as follows. First, 0.1 g of the silver powder was added to and dispersed in 40 mL of isopropyl alcohol (IPA). The dispersion was performed using an ultrasonic homogenizer (device name: US-150T produced by Nihonseiki Kaisha Ltd.; 19.5 kHz; tip diameter of 20 mm). The dispersion time was 2 minutes. The sample that had undergone the dispersion was supplied to the laser diffraction/scattering particle size distribution measurement device, and the particle size distribution was determined using accompanying analysis software.

In Table 2, "(D90-D10)/D50" indicates the value obtained by dividing, by D50, the difference of subtracting D10 from D90. This value indicates the degree of spread of the particle size distribution (sharpness of the particle size distribution). When the value is larger, the particle size distribution is broader. When the value is smaller, the particle size distribution is sharper. Hereafter, "(D90-D10)/D50" is also referred to as the sharpness value.

In Table 2, "Moisture content of silver powder" is the moisture content of the silver powder obtained through the classification step. "Moisture content of agglomerated silver powder" (%) in Table 1 and "Moisture content of silver powder" (%) in Table 2 were calculated as follows. As a sample, 10 g of the agglomerated silver powder or silver powder was placed in a weighing bottle, dried at 90° C. for 3 hours without a lid, and then left to cool for 40 minutes or more. The resultant weight loss of the sample was divided by the weight of the sample before drying (10 g), and the obtained value was multiplied by 100 to yield the moisture content.

In Table 2, "Loss on ignition" (%) was taken to be a value determined as follows. First, 3 g of the silver powder was weighed out, loaded into a magnetic crucible, and heated to 800° C. Heating at 800° C. was performed for 30 minutes so as to cause sufficient heating until the quantity of the silver powder was constant. Thereafter, the silver powder was cooled and weighed to determine the post-heating mass (w). The loss on ignition (%) is a value calculated according to the following formula (2) based on the mass (w):

Loss on ignition(%)=(3−w)/3×100    formula (2).

In Table 2, "TAP" (g/mL) is the tap density of the silver powder. The tap density of the silver powder was taken to be a value determined using a tap density measurement device (Density Measuring System SS-DA-2 produced by Shibayama Scientific Co., Ltd.). The tap density was measured as follows. A silver powder sample was weighed out in an amount of 30 g, loaded into a 20 mL test tube, and then tapping was performed 1000 times with a height of 20 mm. The sample volume (cm³) after tapping was then determined. The tap density (g/cm³) is a value calculated according to the following formula (3) based on the sample volume (cm³) after tapping:

Tap density(g/cm³)=30(g)/(sample volume(cm³) after tapping)   formula (3).

In Table 2, "Sa" (nm) is the arithmetic mean roughness defined in ISO 25178 in the measurement of the surface roughness of silver particles. In Table 3, "Sz", "Sp", "Sv", and "Sq" are the maximum height, maximum peak height, maximum pit height, and root mean square height defined in ISO 25178. These values were calculated based on the shape images taken with a scanning probe microscope (SPM). Specifically, SPM (Nano Cute) produced by SII NanoTechnology Inc. was used, and SI-DF40P2 produced by Hitachi High-Tech Fielding Corporation was used as a cantilever. Tapping mode (DFM) was selected as the measurement mode. In more detail, first, Q curve measurement was performed and the cantilever was adjusted. During this, the resonant frequency was checked to be in a range of 200 Hz to 500 Hz and the Q value was checked to be in a range of 100 to 1000. The target vibration amplitude for the cantilever was 1 V. Next, the SPM was used to acquire a shape image and an error signal image for fine silver particles in a viewing field range of 5 µm. Here, the amplitude attenuation rate was automatically set in a range of −0.1 to −0.2. Moreover, the scanning frequency was set in a range of 0.6 Hz to 1 Hz. Automatic setting of feedback control parameters was adopted. The number of pixels during shape image acquisition was 256×256. An area in which roughness was to be analyzed in the shape image was designated, and then third-order tilt correction and flattening processing were performed so as to remove a component originating from the curved surface of a particle and thereby automatically calculate values for arithmetic mean roughness Sa and Sz, Sp, Sv, and Sq of the particle surface defined in ISO 25178. Cut off processing was not performed at this time. The analysis area was a square area having a side length of 500 nm (hereafter referred to as a 500 nm×500 nm area). In the analysis, 10 particles were randomly selected and analyzed, and an average value was calculated for these particles.

In Table 2, "Sa×D50" (nm²) is the value obtained by multiplying Sa by D50.

In Table 2, "Sa×BET size" (nm²) is the value obtained by multiplying Sa by BET size.

FIGS. 2 to 5, 7, and 8 illustrate SEM images (20000×) of the silver powders in Example 1, Example 2, Comparative Example 1, Reference Example 1, Example 3, and Comparative Example 2, respectively. The SEM images of Examples 1 to 3 show that there are irregularities on the silver particle surfaces. It is presumed that the irregularities on the silver particle surface observed in the SEM images of Examples 1 to 3 are relatively large because the irregularities on the silver particle surfaces generated by the wet reaction were not sufficiently removed in the disintegration and classification steps and remained relatively large on the surfaces of the silver particles constituting the silver powder according to the present disclosure. The irregularities on the silver particle surfaces observed in the SEM images of Comparative Example 1, Reference Example 1, and Comparative Example 2 are smaller than those in Examples 1 to 3. This is presumed to be because, due to low moisture content of the atmosphere surrounding the silver particles in the disintegration and classification steps, the irregularities on the silver particle surfaces were sufficiently removed in the disintegration and classification steps, resulting in smaller irregularities on the silver particle surfaces than those in Examples 1 to 3. The degree of irregularities on the silver particle surfaces in each of the Examples, Comparative Examples, and Reference Example is reflected in its Sa value.

Furthermore, the silver powders in the Examples, Comparative Examples, and Reference Example were used to prepare conductive pastes and thin wire evaluation (EL) was performed.

The silver powders in Examples 1 to 3, Comparative Examples 1 and 2, and Reference Example 1 were each used to prepare a conductive paste as follows. The following processing was performed on the substances with the composition ratios shown in Table 4 to obtain a conductive paste. The substances were mixed through stirring at 1,400 rpm for 30 seconds using a propeller-less planetary stirring and defoaming device (AR310 produced by Thinky Corporation), and then the mixture was passed through a three-roll mill (80S produced by Exakt Technologies Inc.) with a roll gap of 100 µm to 20 µm to be kneaded.

TABLE 4

|  | mass % |
|---|---|
| Silver powder in Example, Comparative Example, Reference Example | 89.9 |
| Glass frit* | 2.0 |
| Ethyl cellulose | 0.1 |
| Hydroxypropyl cellulose | 0.1 |
| Wax** | 0.1 |
| Triethylene glycol butyl methyl ether | 1.6 |
| Terpineol | 1.1 |
| Texanol | 1.3 |
| Butyl carbitol acetate | 1.2 |
| Tributyl citrate | 1.2 |
| Dimethylpolysiloxane 100 cs*** | 0.4 |
| Triethanolamine | 0.3 |
| Castor oil | 0.1 |
| Oleic acid | 0.7 |
| Total | 100.0 |

*Pb—Te—Bi-based
**NAMLON206T produced by Kusumoto Chemicals, Ltd.
***KF96-100 produced by Shin-Etsu Chemical Co., Ltd.

The viscosity of the paste was measured using a viscometer 5XHBDV-IIIUC produced by Brookfield Engineering. The measurement conditions were as follows. CP-52 was used as a cone spindle. The paste temperature was 25° C. The rotation speed and measurement time were 5 minutes at 1 rpm (shear rate 2 sec⁻¹) and 1 minute at 5 rpm (shear rate 10 sec⁻¹).

Thin wire evaluation was performed by forming a conduction pattern. The conduction pattern was formed as follows. First, an aluminum paste (28D22G-2 produced by Rutech) was used to form a 154 mm solid pattern on the rear surface of a silicon substrate (100Ω/□) for solar cells using a screen printer (MT-320TV produced by Micro-tec Co., Ltd.). Next, the paste was filtered through 500-mesh, and then electrodes (finger electrodes) having design line widths (screen opening widths) of 14 µm to 26 µm and electrodes (busbar electrodes) having a design line width of 1 mm were printed (applied) on the front surface of the substrate in a pattern illustrated in FIG. 6 with a squeegee speed of 350 mm/s. The printed paste was dried with hot air at 200° C. for 10 minutes, and then fired with a peak temperature of 750° C. and an in-out time of 41 seconds using a high-speed firing IR furnace (high-speed firing test four-chamber furnace produced by NGK Insulators, Ltd.) to obtain a conduction pattern.

Figure 6:
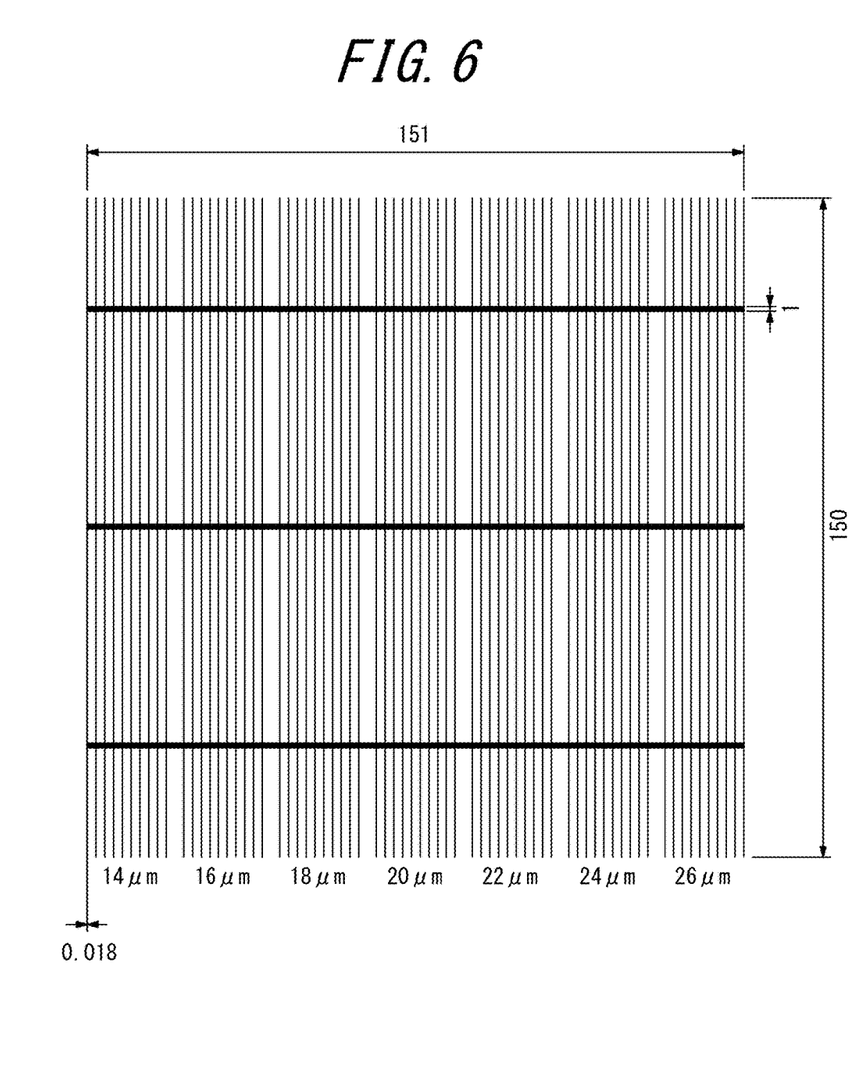
FIG. 6 is a diagram illustrating the shape of an electrode pattern for performing thin wire evaluation.
Figure 7:
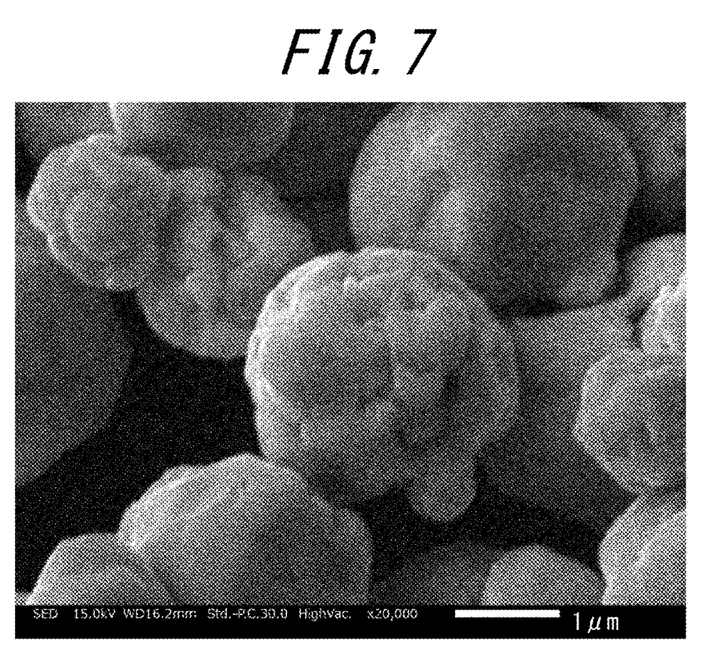
FIG. 7 is an SEM image of a silver powder in Example 3.
Figure 8:
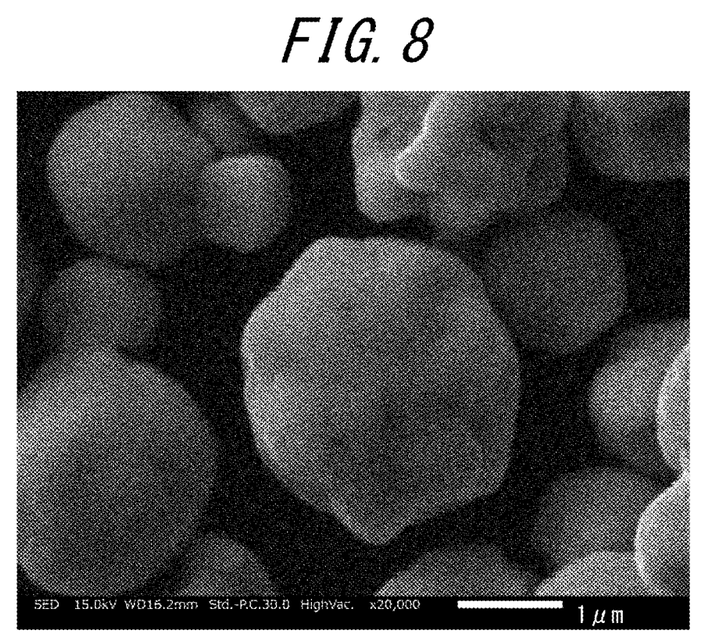
FIG. 8 is an SEM image of a silver powder in Comparative Example 2.

The line width and height of the conductive pattern were measured for the electrodes printed with a design line width of 24 μm out of the design line widths in FIG. 6, using a laser microscope (VKX-1000 produced by Keyence Corporation). Images were taken with a 20× objective lens (electrode length per viewing field: approximately 500 μm), 601 cross-sectional shapes were measured at intervals of 0.687 μm in one viewing field (corresponding to an electrode length of approximately 400 μm), and the average cross-sectional shape was calculated. For the average cross-sectional shape, the distance of the rise from the baseline that is the height of the substrate was measured as the line width and the difference in height between the highest point and the baseline was measured as the height, to obtain the line width and height in one viewing field. Of the 10 electrodes with a design line width of 24 μm, the fourth, sixth, and eighth electrodes from the left were each photographed at two locations, 5 cm and 10 cm from the top end of the electrode, i.e. a total of six locations. The average line width and height of the six viewing fields were calculated.

Table 5 shows the height and line width of the electrodes in the thin line evaluation using the paste containing the silver powder in each of the Examples, Comparative Examples, and Reference Example. Table 5 also shows the viscosity of the paste containing the silver powder in each of the Examples, Comparative Examples, and Reference Example.

TABLE 5

| | Line width μm | Height μm | Aspect ratio | Viscosity | |
|---|---|---|---|---|---|
| | | | | 1 rpm Pa · s | 5 rpm Pa · s |
| Example 1 | 29.9 | 17.7 | 0.59 | 141 | 63 |
| Example 2 | 27.6 | 18.8 | 0.68 | 147 | 62 |
| Comparative Example 1 | 31.4 | 17.2 | 0.55 | 124 | 58 |
| Reference Example 1 | 31.6 | 16.2 | 0.51 | 122 | 58 |
| Example 3 | 29.1 | 12.4 | 0.43 | 88 | 47 |
| Comparative Example 2 | 32.0 | 12.5 | 0.39 | 79 | 48 |

As can be seen from Table 5, regarding Comparative Example 1, Reference Example 1, and Examples 1 and 2 using the same agglomerated silver powder, the pastes containing the silver powders in Examples 1 and 2 achieved a conductive pattern line width closer to the design line width in the thin wire evaluation and thus had favorable properties as compared with Comparative Example 1 and Reference Example 1. In addition, the pastes containing the silver powders in Examples 1 and 2 increased the aspect ratio, i.e. the height divided by the line width, while achieving a conductive pattern line width closer to the design line width, and thus had favorable properties. Regarding Comparative Example 2 and Example 3 using the same agglomerated silver powder, the paste containing the silver powder in Example 3 increased the aspect ratio while achieving a conductive pattern line width closer to the design line width and thus had favorable properties as compared with Comparative Example 2.

These results of the thin wire evaluation demonstrate that the silver powder in each Example can be used to prepare a paste capable of forming a wiring pattern with desired line width and height.

As can be seen from Table 2, when the operating conditions of the plant 100 were changed as shown in Table 1 for the same agglomerated silver powder as in the Examples, Comparative Examples, and Reference Example, the silver powder in each Example had larger surface irregularities and a higher Sa value than the silver powder in each Comparative Example or Reference Example.

Moreover, as can be seen from Table 2, in Examples 1 and 2, the exhaust of the mill 2 flowing through the connection pipe 23 was controlled to a temperature of 30° C. or more and an absolute humidity of 20 g/m$^3$ or more to improve the classification performance of the classifier, resulting in (D90−D10)/D50 smaller than that in Comparative Example 1. Likewise, in Example 3 using an agglomerated silver powder different from that used in Example 1, (D90−D10)/D50 was smaller than that in Comparative Example 2.

Thus, a silver powder having an appropriate degree of irregularities on its silver particle surfaces needs to be used in order to prepare a paste capable of forming a wiring pattern with desired line width and height. This is clear from the SEM images of the silver powders in the Examples, Comparative Example, and Reference Example illustrated in FIGS. 2 to 5, 7, and 8. In detail, in the silver powders in the Examples (see FIGS. 2, 3, and 7), an appropriate degree of irregularities can be observed on the surfaces of the spherical silver particles. In the silver powders in the Comparative Examples and Reference Example (see FIGS. 4, 5, and 8), the surfaces of the silver particles have smaller irregularities and are overall smoother than in the silver powders in the Examples. With the production method according to this embodiment, smoothing of the silver particle surfaces can be suppressed to thus obtain silver particles suitable for preparation of a paste capable of forming a wiring pattern with desired line width and height.

Regarding the operating conditions of the plant 100 shown in Table 1, a method of producing a silver powder that enables preparation of a paste capable of forming a wiring pattern with desired line width and height is not a production method in which an agglomerated silver powder is dried in advance and then subjected to processing other than drying in the plant 100 as in the Comparative Examples and Reference Example but a production method in which an agglomerated silver powder is disintegrated, classified, and dried in the plant 100 to obtain a silver powder as in the Examples. In order to dry the agglomerated silver powder in the plant 100 to obtain the dried silver powder, it is necessary that compressed air at a temperature of 80° C. or more and 180° C. or less is supplied to the mill 2 in the disintegration step and also the exhaust of the mill 2 is supplied to the classifier 3 and the exhaust has a temperature of 30° C. or more and a relative humidity of 30% or more.

As described above, it is possible to provide a method of producing a silver powder and the silver powder that enable preparation of a conductive paste capable of forming a wiring pattern with desired line width and height.

Structures disclosed in the foregoing embodiments (including alternative embodiments; hereafter the same applies) can be used in combination with structures disclosed in other embodiments as long as they are not in contradiction. The embodiments disclosed in this specification are illustrative, and the present disclosure is not limited to such embodiments and modifications can be made as appropriate without departing from the object of the present disclosure.

INDUSTRIAL APPLICABILITY

The present disclosure can be applied to a method of producing a silver powder and a silver powder.

REFERENCE SIGNS LIST 1 feeder
100 plant 2 mill (airflow type mill)
21 mill supply port
22 heater
23 connection pipe
24 air pump
26 humidity-temperature meter
27 flowmeter
29 mill exhaust port
3 classifier (pneumatic classifier)
31 classifier supply port
35 coarse powder discharge port
39 classifier exhaust port
4 cyclone
41 cyclone inlet port
49 collection pot
5 dust collector
6 blower

The invention claimed is:

1. A method of producing a silver powder, the method comprising:
    a disintegration step of disintegrating an agglomerated silver powder in an airflow type mill; and
    a classification step of classifying a silver powder after the disintegration step, in a pneumatic classifier,
    wherein the agglomerated silver powder has a moisture content of 2 wt % or more and 20 wt % or less,
    in the disintegration step, compressed air at a temperature of 80° C. or more and 180° C. or less is supplied to the airflow type mill as supply air,
    in the classification step, an exhaust of the airflow type mill and the silver powder after the disintegration step are supplied to the pneumatic classifier, and
    the exhaust has a temperature of 30° C. or more and a volumetric humidity of 20 g/m$^3$ or more.

2. The method of producing a silver powder according to claim 1, wherein the pneumatic classifier and the airflow type mill are connected by a connection pipe, and the exhaust of the airflow type mill and the silver powder after the disintegration step are supplied from the airflow type mill to the pneumatic classifier through the connection pipe.

3. The method of producing a silver powder according to claim 1, further comprising
    a collection step of collecting a silver powder after the classification step, in a collector,
    wherein in the collection step, an exhaust of the pneumatic classifier and the silver powder after the classification step are supplied to the collector.

4. The method of producing a silver powder according to claim 1, wherein in the classification step, the silver powder is classified while outside air is sucked into the pneumatic classifier.

* * * * *